June 25, 1940.   G. E. DUFFY   2,205,518

EXTRUDING HEAD

Filed Aug. 13, 1936

INVENTOR
GEORGE E. DUFFY
BY
Brockett, Hyde, Higley & Meyer
ATTORNEYS

Patented June 25, 1940

2,205,518

UNITED STATES PATENT OFFICE 2,205,518

EXTRUDING HEAD

George E. Duffy, Port Clinton, Ohio, assignor to The Standard Products Company, Cleveland, Ohio, a corporation of Ohio Application August 13, 1936, Serial No. 95,864

4 Claims. (Cl. 18—13)

This invention relates to an extruding machine for coating with a plastic stock a continuous strip of material fed through the machine, and more particularly for coating a flat strip of material such as steel with a plastic stock containing rubber or a compound thereof.

An object of the present invention is to provide an extruding head which requires less power to coat a given amount of plastic stock upon a predetermined strip than that required by prior heads known to me.

Another object of the present invention is to provide an extruding head for coating strip material in an improved manner so that plastic stock may be made to adhere to the strip material more firmly than in the machines of the prior art.

Another object of the present invention is to provide an extruding head in which the layer of plastic stock is evenly distributed about the coated strip and in which the thickness of the layer may be closely controlled.

Another object of the present invention is to provide an extruding head in which plastic stock is directed toward a continuous strip of material fed through the head in planes normal to the flat faces of the coated strip.

My invention also provides a novel strip guide and a novel extruding die, together with improved means for holding such guide and die in an extruding head in a manner to permit quick replacement thereof.

My invention also provides novel means for insuring that the extruding head is completely filled with plastic stock during the coating operation.

Other novel features and advantages of my extruding head will be apparent from the accompanying description and drawing and the essential features will be summarized in the claims.

Figure 1:
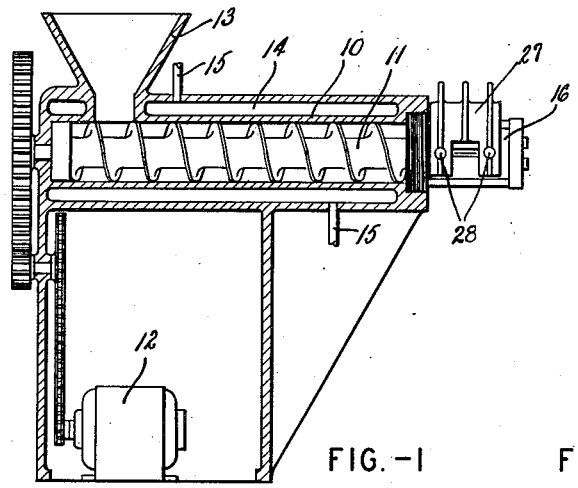
Figure 2:
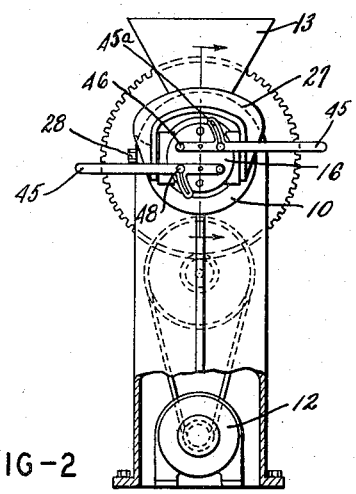
Figure 3:
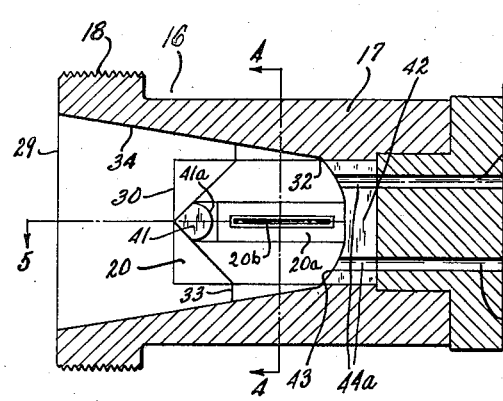
Figure 4:
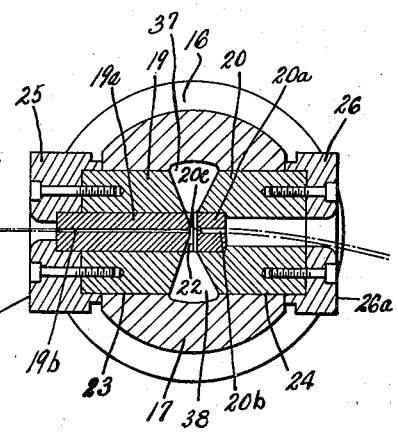
Figure 5:
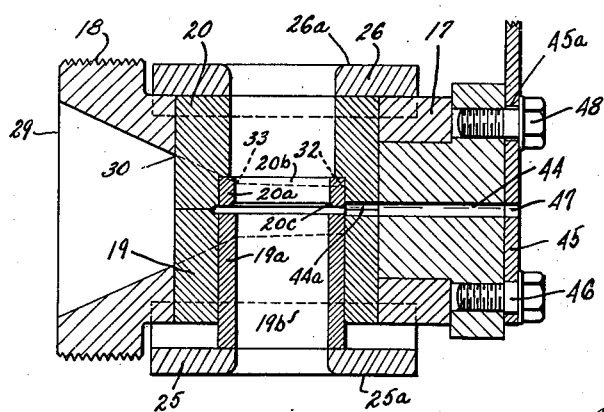
Figure 6:
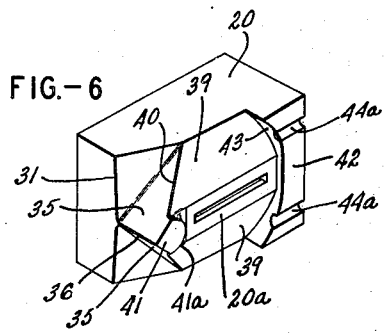

In the drawing, Fig. 1 is a longitudinal sectional view through a machine embodying my invention; Fig. 2 is an end elevation of the machine of Fig. 1, partly broken away to show the location of the driving motor; Fig. 3 is a central vertical section through the extruding head of the machine shown in Fig. 1; Figs. 4 and 5 are sectional views along similarly numbered lines of Fig. 3; while Fig. 6 is a perspective view of the extruding die block of Figs. 3, 4 and 5.

Certain features of my invention may be realized using any means for forcing plastic stock toward the extruding head along certain lines or planes as will be hereinafter described. For purposes of illustration, however, I have shown a well-known type of extruding machine in which the plastic stock is fed toward the extruding head by means of a screw conveyor housed in a cylinder. In Figs. 1 and 2 the cylinder is indicated at 10 housing a feed screw conveyor 11 and the screw conveyor is rotated in a manner to feed the plastic stock from left to right as viewed in Fig. 1 by means of suitable driving mechanism connecting the screw conveyor with the motor 12 mounted in the base of the machine 10 frame. The cylinder is provided with a feed hopper 13 for receiving the plastic stock and the cylinder may also be provided with a suitable jacket 14 to which a fluid medium may be supplied for controlling the temperature of the plastic stock by means of the supply lines 15.

A side delivery extruding head 16 is connected with the delivery end of cylinder 10. The details of this extruding head are best shown in Figs. 3, 4 and 5. The main casing member 17 of the extruding head 16 is provided with threads 18 for attachment to the cylinder 10. A strip guide block 19 and an extruding die block 20 are positioned in the extruding head in a manner to guide a strip of material, indicated at 21, in a direction transversely of the axis of the cylinder and with its flat surfaces lying substantially in the same plane with the cylinder axis. The guide block may be provided with an insert member 19a having an opening 19b therethrough of a size to permit the strip 21 to slide easily through the opening. The die block 20 is provided with a die 20a having a slotted opening 20b of such a size and shape as to permit the coating of the desired thickness of plastic stock about the strip 21 as it passes through the die. Preferably the leading edges of the die opening are beveled as shown at 20c to insure an even flow of the plastic stock into contact with the strip material. The guide block and die block are held in position in the extruding head with their openings aligned as shown in Fig. 4 and slightly spaced apart, thus providing a space 22 between them where the strip material is exposed to the plastic stock for coating. It will be noted that the space 22 is narrow but permits access of the plastic stock to all surfaces of the strip 21 as it is fed through the extruding head. It will be noted also that the opening 22 is substantially an elongated opening extending generally vertical and in substantial alinement with the axis of the cylinder 10.

The guide block 19 is positioned in a suitable opening 23 in the extruding head and the die block 20 is positioned in a similar opening 24 opposite the opening 23. In the form shown the blocks are each provided with a holder, 25 for block 19 and 26 for block 20. These block holders are suitably secured to their respective blocks and provide on their outermost faces 25a and 26a parallel surfaces extending in a general vertical direction in the type of machine shown. A one-piece rigid clamp 27, C-shape in form, is adapted to embrace the extruding head and the arms of the clamp snugly engage the surfaces 25a and 26a of the guide block holder and of the die block holder respectively. The inner faces of the arms of the C clamp may be arranged to fit snugly against the surfaces 25a and 26a respectively but preferably a slight play occurs so that clamping screws 28 are preferably provided having a threaded engagement with one arm of the C clamp and bearing against an outer face of one of the block holders so as to hold the blocks securely in position in the extruding head.

In prior machines known to me having side delivery extruding heads, the plastic stock has been first delivered to the extruding head in planes parallel to the axis of the feed cylinder and was then turned in the general direction of travel of the strip material so as to approach said strip material for coating the same while the plastic stock and the strip material were travelling in the same general direction. In my improved extruding machine, however, I cause the plastic stock to travel toward the exposed portion of the strip 21 in the space 22 first in planes generally parallel to the axis of cylinder 10 and then in planes normal to the flat surfaces of the strip 21 so that the plastic stock approaches the coated surface of the strip while travelling generally perpendicular to such coated surfaces rather than generally parallel to such surfaces as in the prior art. I find that by causing the plastic stock to travel in this manner there is an appreciable saving of power required for a given coating job and that the coating adheres to the strip material better than when coated in machines using the parallel flow principle.

The stock guiding surfaces of the extruding head converge gradually in a frustro-conoidal shape from line 29 to line 30. At this point the interior surfaces of the extruding head substantially coincide with the edges 31 of block 19 and with similar edges on block 20. The upper and lower interior stock guiding surfaces of the extruding head from line 30 to line 32 are terete surfaces rapidly converging from line 30 to line 33 and very gradually converging from there to line 32. These surfaces are indicated at 34 in the drawing.

Means is provided before the plastic stock reaches the strip coating opening 22 to divide the plastic stock into two substantially equal streams, one of which is directed above the strip and the other below the strip and each of these streams is then guided toward one of the flat faces of the strip while each of the streams is gradually contracted between converging walls. In the form shown the blocks 19 and 20 are provided with stock guiding surfaces for thus dividing the stream of plastic stock. Since these two blocks are almost exactly alike (save for a slight difference in the angle of the surfaces directing the stock perpendicularly toward the flat faces of the strip) block 20 is described and it will be understood that block 19 is the same. As shown in the various views and most clearly in Fig. 6, block 20 is provided with stock guiding surfaces 35 meeting in a sharp edge 36 on the cylinder side of the opening 22 and substantially in a plane with the axis of the cylinder 10. These surfaces 35 diverge as they extend rearwardly from the edge 36 and together with similar surfaces on block 19 divide the stream of plastic stock into two streams, one of which passes into chamber 37 above the strip 21 and the other of which passes into chamber 38 below the strip. Other stock guiding surfaces 39 on block 19 and similar surfaces on block 20 starting from a point adjacent opening 22 diverge as they extend away from such opening. The surfaces 35 and 39 of block 20, and similar surfaces on block 19 meet along lines 40 in such a manner that the stock flows evenly over these surfaces but so that the material farthest from the cylinder axis has the longest travel.

Means is provided insuring that the blocks 19 and 20 are spaced apart a predetermined distance when forced into position in the extruding head in contact with each other. In the embodiment shown, projection 41 on block 20 meets a similar projection on block 19 for such spacing purpose at the forward end of the blocks, while surface 42 of block 20 and a similar surface on block 19 serve to space the blocks at the rear end of the machine. The projections 41 of block 20 and the similar part of block 19 are preferably continuations of the surfaces 35 and serve to prevent direct flow of plastic stock toward the edge of the strip 21 nearer the cylinder 10. The trailing edge of projection 41 is rounded as shown at 41a to provide a satisfactory flow of plastic stock toward the nearer edge of the strip 21. The limiting surfaces 43 at the rear end of blocks 19 and 20 are located beyond the rear edge of strip 21 and are curved outwardly as the material approaches the cylinder axis as shown in Figs. 3 and 6 to properly direct the plastic stock to the rear edge of the flat strip.

To insure that the extruding head and more particularly that chambers 37 and 38 are always filled with plastic stock, leak ports 44 are provided leading out of the extruding head from points adjacent to and equidistant from the rear edge of the strip 21. In the form shown, in alinement with the openings in the extruding head mating openings 44a in blocks 19 and 20 permit a small amount of plastic stock to escape to the rear face of the extruding head. Here means is provided for controlling the amount of plastic stock escaping through the openings 44 in the head closure block. In the form shown levers 45 are pivotally mounted on the extruding head at points 46 and provided with openings through the levers at 47 which by lever oscillation are placed wholly or partially in alinement with openings 44 so as to control the size of the stream through the leak ports. By means of slotted portions 45a of levers 45 and set screws 48 levers 45 may be held in any adjusted positions. Means is provided for varying the speed of the feed screw 11 preferably by making motor 12 a variable speed motor. By inspection of the material extruded through leak ports 44 from time to time the motor 12 may be controlled as to its speed so as to insure a constant small leak through the ports 44 thus telling the operator that the extruding head is full of plastic stock.

What I claim is:

1. In an extruding machine for coating a flat strip of material with a plastic stock, a cylinder for receiving said stock, means for feeding said stock along said cylinder, a side delivery die head secured to the delivery end of said cylinder, a strip guide block, a die block, there being an opening in each of said blocks permitting passage of said strip therethrough, said blocks being positioned in said head with said openings spaced apart and alined in a manner to position said strip transversely of the axis of said cylinder and substantially in a plane with said axis, each of said blocks having stock guiding surfaces meeting in a sharp edge in said plane and at the front end of the block nearer the cylinder, said surfaces diverging from said plane as they extend rearwardly from said edge, said blocks having other stock guiding surfaces on each side of the strip diverging from said alined openings, and said stock guiding surfaces on each block merging smoothly, one with the other.

2. An extruding machine as in claim 1, in which said blocks have mutually engaging portions for spacing said blocks.

3. An extruding machine as in claim 1, in which said blocks have mutually engaging portions for spacing said blocks, and said portions forming part of said first named stock guiding surfaces.

4. In an extruding machine, a die head, a guide block, a die block, there being openings through said blocks alined to guide strip material through said head, there being openings on opposite sides of said head holding said blocks, and a one-piece clamp embracing said head and having arms extending on each side of said head and engaging against outer faces of said blocks and holding the latter in position.

GEORGE E. DUFFY.